United States Patent
Bai et al.

(10) Patent No.: US 8,497,338 B2
(45) Date of Patent: Jul. 30, 2013

(54) PROCESS OF MANUFACTURING ORGANOSILICON PRODUCTS WITH IMPROVED QUALITY USING HETEROGENEOUS PRECIOUS METAL CATALYSTS

(75) Inventors: He Bai, Vienna, WV (US); Kevin L. Bobbitt, Parkersburg, WV (US); Michael R. Powell, New Martinsville, WV (US)

(73) Assignee: Momentive Performance Materials Inc., Waterford, NY (US)

( * ) Notice: Subject to any disclaimer, the term of this patent is extended or adjusted under 35 U.S.C. 154(b) by 0 days.

(21) Appl. No.: 13/285,628

(22) Filed: Oct. 31, 2011

(65) Prior Publication Data
US 2013/0109772 A1    May 2, 2013

(51) Int. Cl.
C08G 77/04 (2006.01)
C08G 77/06 (2006.01)
C07F 7/08 (2006.01)
C08K 5/5419 (2006.01)
C08L 75/04 (2006.01)

(52) U.S. Cl.
USPC .............. 528/10; 528/25; 528/29; 521/112; 556/451

(58) Field of Classification Search
None
See application file for complete search history.

(56) References Cited

U.S. PATENT DOCUMENTS

| | | |
|---|---|---|
| 2,632,013 A | 3/1953 | Wagner |
| 2,637,738 A | 5/1953 | Wagner |
| 2,823,218 A | 2/1958 | Speier et al. |
| 2,851,473 A | 9/1958 | Wagner |
| 3,220,972 A | 11/1965 | Lamoreaux |
| 3,775,452 A | 11/1973 | Karstedt |
| 4,064,154 A | 12/1977 | Chandra et al. |
| 4,533,744 A | 8/1985 | Williams, Jr. |
| 4,614,812 A * | 9/1986 | Schilling, Jr. ............ 556/406 |
| 4,900,520 A * | 2/1990 | Behnam et al. ............ 75/426 |
| 5,104,647 A | 4/1992 | Policello |
| 5,206,402 A | 4/1993 | McVannel et al. |
| 5,270,424 A | 12/1993 | Drake et al. |
| 5,558,806 A | 9/1996 | Policello et al. |
| 5,674,832 A | 10/1997 | Keys |
| 6,046,156 A | 4/2000 | Perry |
| 6,054,547 A | 4/2000 | Perry et al. |
| 6,060,546 A | 5/2000 | Powell et al. |
| 6,075,111 A | 6/2000 | Perry et al. |

(Continued)

FOREIGN PATENT DOCUMENTS

| | | |
|---|---|---|
| EP | 0 546 716 A1 | 6/1993 |
| EP | 0 548 974 A1 | 6/1993 |
| EP | 0 934 947 A2 | 8/1999 |

OTHER PUBLICATIONS

International Search Report and Written Opinion dated Feb. 19, 2013.

*Primary Examiner* — Robert S Loewe
(74) *Attorney, Agent, or Firm* — Dominick G. Vicari; Kenneth S. Wheelock

(57) ABSTRACT

A process for manufacturing an organosilicon product having a stabilized low color and no formation of black particles during storage includes (a) reacting an unsaturated compound with a silicon compound having a reactive Si—H bond under hydrosilylation conditions in a reaction zone in the presence of a heterogeneous precious metal catalyst to provide an organosilicon product having a color of less than 40 pt/co; (b) separating the heterogeneous precious metal catalyst from the organosilicon product; and (c) recovering the heterogeneous precious metal catalyst.

36 Claims, 2 Drawing Sheets

U.S. PATENT DOCUMENTS

| | | |
|---|---|---|
| 6,077,923 A | 6/2000 | Perry et al. |
| 6,083,901 A | 7/2000 | Perry et al. |
| 6,087,523 A | 7/2000 | Bank et al. |
| 6,100,408 A | 8/2000 | Monkiewicz et al. |
| 6,153,578 A | 11/2000 | Perry |
| 6,177,585 B1 | 1/2001 | Chen et al. |
| 6,221,811 B1 | 4/2001 | Policello et al. |
| 6,271,295 B1 | 8/2001 | Powell et al. |
| 6,350,824 B1 | 2/2002 | Baumann et al. |
| 6,545,115 B2 * | 4/2003 | Breunig et al. ............ 528/31 |
| 7,005,472 B2 * | 2/2006 | Anderson et al. .......... 524/588 |
| 7,038,001 B2 | 5/2006 | Breunig et al. |
| 2002/0068807 A1 | 6/2002 | Breunig et al. |
| 2009/0018301 A1 * | 1/2009 | Thomas et al. ............ 528/15 |
| 2009/0203802 A1 * | 8/2009 | Kamei et al. ............ 514/769 |
| 2011/0294964 A1 * | 12/2011 | Nickel et al. ............ 525/474 |
| 2012/0022280 A1 * | 1/2012 | Nickel et al. ............ 556/441 |

* cited by examiner

US 8,497,338 B2

PROCESS OF MANUFACTURING ORGANOSILICON PRODUCTS WITH IMPROVED QUALITY USING HETEROGENEOUS PRECIOUS METAL CATALYSTS

BACKGROUND

1. Field of the Invention

The present invention relates to a process for the manufacture of organosilicon products by hydrosilation in the presence of a catalyst.

2. Background of the Art

Hydrosilation reactions for syntheses of organosilicon, i.e., organosiloxane or organosilane, products are well known and generally involve catalyzed hydrosilation of an unsaturated compound with a silane or a silicon polymer containing reactive silanic-hydrogen and/or hydrogen-siloxy units in the presence of a precious metal catalyst, e.g., platinum (Pt), rhodium and palladium. When traditional homogeneous precious metal catalysts, e.g., chloroplatinic acid (CPA) solution and Karstedt's catalyst, are used, precious metal catalysts remain in organosilicon product-containing reaction media, e.g., siloxane or silane streams, causing significant precious metal waste, high color in organosilicon products, and black particle formation due to slow precious metal precipitation causing customer complaints of organosilicon products such as cosmetic and personal use products.

In certain organosilicon products, there is a low color specification. For example, a hydrosilylation product of triethoxysilane with 1-octene needs to have a color of less than 30 pt/co (as determined by ASTM D1209). However, the existence of precious metal catalysts such as platinum in the product causes product color, i.e., having a color of much more than 30 pt/co. As a result, heavy distillation is needed to remove precious metals and to reduce product color. This additional heavy distillation step not only reduces product yield but also significantly increases final product cost.

Homogeneous precious metal catalysts, e.g., chloroplatinic acid solution invented by Speier et al. (U.S. Pat. No. 2,823,218), platinum siloxane solution invented by Karstedt (U.S. Pat. No. 3,775,452), chloroplatinic acid reaction product (U.S. Pat. No. 3,220,972), etc., are commonly used in hydrosilation reactions for syntheses of organosilicon, i.e., organosiloxane or organosilane, products. As a result, precious metals remain in final organosilicon products, causing significant precious metal waste, high color in organosilicon products, and black particle formation due to slow precious metal precipitation causing customer complaints of organosilicon products such as cosmetic and personal use products.

Use of heterogeneous precious metal catalysts in hydrosilation reactions is known. As early as in 1950's, Wagner et al. have used platinum black, platinized silica gel, and platinized asbestos (U.S. Pat. No. 2,632,013), platinum on charcoal (U.S. Pat. No. 2,637,738), and platinum on gamma alumina (U.S. Pat. No. 2,851,473) in hydrosilation reactions to make organosilane products.

U.S. Pat. No. 7,038,001 teaches a method for preparing silicone oils by hydrosilation of polyorganohydrosiloxanes with units containing at least one hydrocarbon ring including an oxygen atom, in the presence of a commercial heterogeneous catalyst (e.g., platinum on charcoal or carbon black, platinum on alumina, etc.). The use of heterogeneous catalyst could (1) minimize ring open polymerization during hydrosilation and devolatilization and produce constant low-viscosity product; (2) reduce isomerization of unsaturated synthon; and (3) reduce product platinum content, color and turbidity. However, the method disclosed in this invention is not for general hydrosilation reactions to make organosiloxane and organosilane products. Moreover, the method disclosed in this patent employs devolatilization of the silicon oil, which is not required in the present invention.

U.S. Pat. No. 4,533,744 teaches the synthesis of a new heterogeneous hydrosilation catalyst having platinum atoms anchored onto a hydroxylated oxide of silicon or aluminum by Pt—S linkages through sulfur organo siloxy groups, and the catalyst can be reused. U.S. Pat. No. 4,064,154 teaches the preparation of a catalyst carrier substance by reacting an inorganic particulate solid having surface hydroxyl groups with an organosilicon compound containing sulfur. The carrier can be converted to a supported catalyst by reaction with a compound or complex of platinum or rhodium. The catalyst can be recovered and recycled and is useful for hydrosilation reactions. U.S. Pat. No. 5,347,027 teaches an electroless process for making a hydrosilation catalyst by contacting a base metal with a chemical cleaning agent and simultaneously or sequentially treating said base metal under reducing conditions with a noble metal-containing material, and the catalyst is recoverable and reusable. U.S. Pat. No. 6,177,585 teaches the synthesis of a bimetallic heterogeneous platinum catalyst comprising an active hydrosilating metal such as platinum in elemental or compound form, and a surface segregating metal such as copper in elemental or compound form on a support. The bimetallic catalyst showed significantly improved catalytic performance compared to the single precious metal catalyst. These four patents disclose methods to synthesize new heterogeneous precious metal catalysts for hydrosilation reactions, and the catalysts are recoverable and reusable. However, these patents did not teach applications of heterogeneous catalysts as an effective way to improve organosilicon product quality (e.g., remove color and eliminate black particle formation) and simplify organosilicon manufacturing process (e.g., eliminate the step of heavy distillation for precious metal removal).

U.S. Pat. No. 6,087,523 teaches the use of commercial $Pt/Al_2O_3$ heterogeneous catalyst in hydrosilation to make organosilane. The invention specifically refers to the hydrosilation of unsaturated reactants where the unsaturation is in the internal portion of the reactant's structure, for example, as in cyclopentene and cyclohexene.

U.S. Pat. No. 6,100,408 teaches the preparation of 3-glycidyloxypropyltrialkoxysilanes from allyl glycidyl ether and trialkoxysilane via platinum-catalyzed hydrosilation. The catalyst used was self-synthesized heterogeneous platinum (0) on a nonmetallic support, and the process is preferred at a continuous fixed-bed process. This invention specifically refers to preparation of 3-glycidyloxypropyltrialkoxysilanes and no other organosilicon products are included.

U.S. Pat. No. 5,206,402 teaches a process for preparation of omega-alkenylchlorosilanes. The process comprises reacting a mixture comprising an α,Ω-diene and an organohydrosilane in the presence of a supported platinum catalyst. A preferred process is run as a continuous process employing a fixed-bed of silica gel supported platinum catalyst. The inventors have discovered that migration of the unsaturated bond from a terminal to an internal position in the desired silicon-bonded group can be reduced in the presence of a supported platinum catalyst and with controlled mole ratio of α,Ω-diene to organohydrosilane.

U.S. Pat. No. 5,270,424 discussed a similar matter for reaction of a silicon compound having SiH groups with a diene having at least 5 carbon atoms. The use of Pt/Silica heterogeneous catalyst could reduce the content of isomers resulting from migration of double bond to internal position.

U.S. Pat. No. 6,350,824 teaches the application of a newly designed continuous hydrosilation reactor, including the use of heterogeneous precious metal catalysts in fixed-bed mode. Numerous examples of hydrosilation reactions were provided and very short residence times in the reaction zone were required to achieve complete conversions according to the invention. Again, the patent did not present the applications of heterogeneous catalysts as an effective way to improve organosilicon product quality (e.g., remove color and eliminate black particle formation) and simplify organosilicon manufacturing process (e.g., eliminate the step of heavy distillation for precious metal removal).

SUMMARY

To solve such product quality issues, we propose that the use of heterogeneous precious metal catalysts can be a solution since heterogeneous precious metal catalysts can be easily separated out from the product bulk solutions by simple filtration, thus, the product quality issues caused by precious metal presence can be eliminated. Accordingly a process for manufacturing an organosilicon product having a stabilized low color and no significant or observable formation of black particles during storage is provided herein. The process comprises the steps of (a) reacting an unsaturated compound with a silicon compound having a reactive Si—H bond under hydrosilylation conditions in a reaction zone in the presence of a heterogeneous precious metal catalyst to provide an organosilicon product having a color of less than 40 Pt/Co; (b) separating the heterogeneous precious metal catalyst from the organosilicon product; and (c) recovering the heterogeneous precious metal catalyst, wherein the organosilicon product is a component in at least one of a personal care composition, an agricultural composition, a home care composition, a polyurethane foam composition or a plastic additive composition.

BRIEF DESCRIPTION OF THE DRAWINGS

Various embodiments are described below with reference to the drawings wherein.

DETAILED DESCRIPTION OF PREFERRED EMBODIMENT(S)

Figure 1:
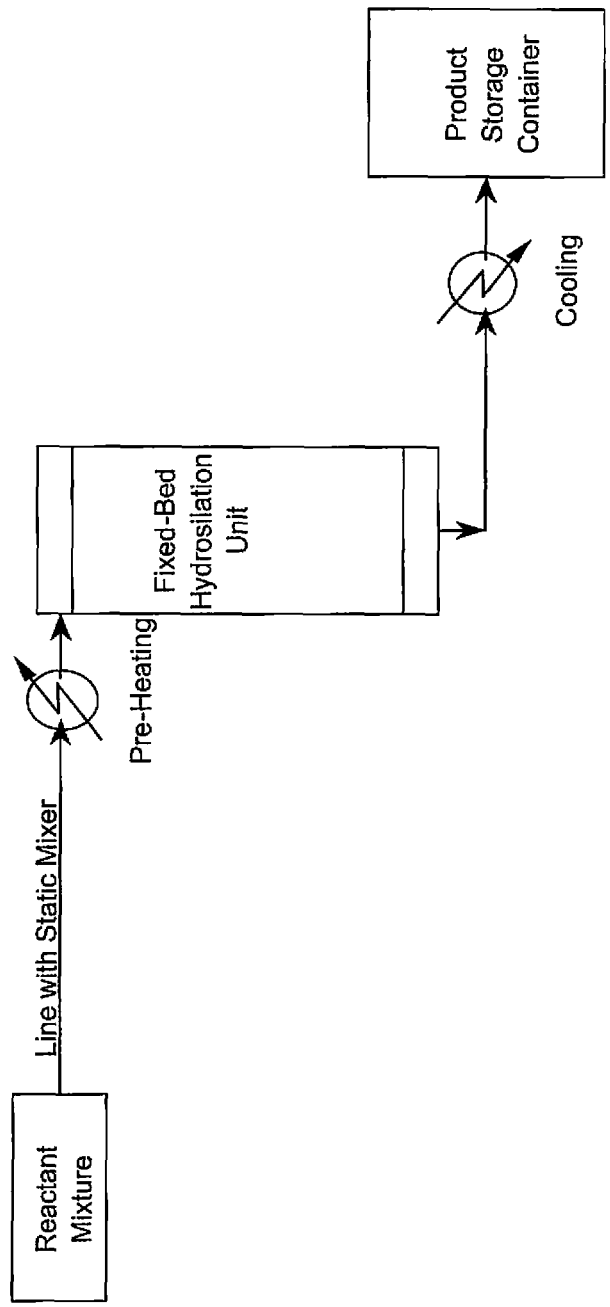
FIG. 1 is a diagrammatic illustration of a fixed bed hydrosilation unit with a continuous single-pass mode.

Other than in the working examples or where otherwise indicated, all numbers expressing amounts of materials, reaction conditions, time durations, quantified properties of materials, and so forth, stated in the specification and claims are to be understood as being modified in all instances by the term "about." The terms "hydrosilation" and "hydrosilylation" and their derivatives refer to the same process and are used interchangeably herein.

It will also be understood that any numerical range recited herein is intended to include all sub-ranges within that range.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

The present invention is a process of manufacturing organosilicon (i.e., organosiloxane or organosilane), products using heterogeneous precious metal catalysts to improve organosilicon product quality (e.g., remove color and eliminate black particle formation) or simplify organosilicon manufacturing process (e.g., eliminate the step of heavy distillation for precious metal removal). The process consists the steps of: a) hydrosilylating the unsaturated compounds with a silane or a silicon polymer containing reactive silanic-hydrogen and/or hydrogen-siloxy units in the presence of a heterogeneous precious metal catalyst to make the organosilicon products; b) separating the heterogeneous precious metal catalyst from the liquid reaction medium; and, c) recovering by incineration or reusing the heterogeneous previous metals.

The present invention provides a process for significant precious metal recovery from an organosilicon product-containing liquid reaction medium produced from hydrosilation reaction. Further, the present invention provides for separation of precious metal catalyst from an organosilicon product-containing liquid reaction medium to significantly reduce the product color and precious metal precipitation of organosilicon products. Further, for certain organosilicon products where distillation is required only for removing precious metal and reducing product color, the present invention provides a process of precious metal and product color removal and thus eliminates the costly distillation step, thus increasing product yield and significantly reducing final product cost. Further, using heterogeneous precious metal catalyst, isomerization of the unsaturated compound, i.e., migration of the unsaturated bond from a terminal to an internal position, is reduced, which could result in significant raw material savings and significantly reduced waste generation. Further, using heterogeneous precious metal catalyst, by-product formation is reduced and desirable product purity is improved, which could result in significantly improved production yield and significantly reduced waste generation. Further, heterogeneous precious metal catalyst does not lose reactivity during the course of the hydrosilylation reaction, thus, no re-catalysis is needed at the end to complete the hydrosilylation reaction. Further, the present invention provides a commercially feasible and economical process for accomplishing the above objectives.

Accordingly, it is an object of this invention to provide a process for recovery of a precious metal catalyst from an organosilicon product-containing liquid reaction medium. The process comprises of hydrosilylating the unsaturated compounds with a silane or a silicon polymer containing reactive silanic-hydrogen and/or hydrogen-siloxy units in the presence of a heterogeneous precious metal catalyst to make the organosilicon products; separating the heterogeneous precious metal catalyst from the liquid reaction medium; and, recovering by incineration or reusing the heterogeneous previous metals.

Figure 2:
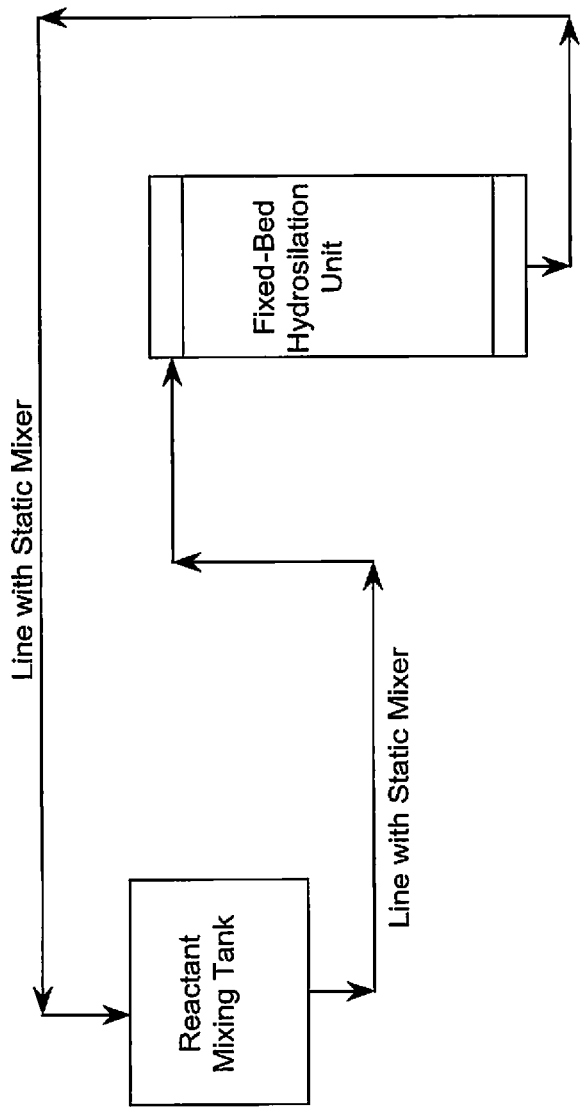
FIG. 2 is a diagrammatic illustration of a fixed bed hydrosilation unit with a batch recirculation mode.

The hydrosilation reactions using heterogeneous precious metal catalysts can be carried out in a batch reactor, a continuous stirred-tank reactor (CSTR), or a fixed-bed reactor (FBR). When using a batch reactor or a CSTR, relatively low dosage (<50 ppm Pt equivalent) of heterogeneous catalyst is preferred to maximize the process economics (high Pt dosage will need more catalyst reuse times to make the process economical). After hydrosilation, precious metal catalysts can be easily separated from organosilicon products by simple filtration or decantation. When using a FBR, premixed reactants passed through the precious metal catalyst-packed hydrosilation reactor (either in continuous single-pass mode (as shown in FIG. 1) or in batch recirculation mode (as shown in FIG. 2) depending on reaction rates and process preference) to make precious metal-free organosilicon products and no separation step is required since catalysts are retained in the FBR. A fixed-bed reactor is a reactor (e.g., a cylindrical column) in which solid catalyst (e.g., heterogeneous precious metal catalyst) is placed in and remains stationary inside the reactor to catalyze the hydrosilation reactions.

In FIG. 1, the reactant mixture can be provided by different ways, e.g., a pre-mixing tank, separate raw material feeding lines etc. In FIG. 2, the raw materials can be mixed in the tank by different ways, e.g., mechanic mixing, ultrasonic mixing, hydrodynamic cavitation mixing etc. Static mixers can be used in feeding lines to prevent non-mixable reactants phase separation.

Suitable supporting materials for the heterogeneous catalysts may include a polymer backbone matrix, an inorganic backbone matrix or a mixture thereof. Supporting materials with inorganic backbone matrices are preferable for excellent thermal and mechanical stability in catalytic conditions, which may include activated carbon, alumina, silica, functionalized silica, zeolites etc. Platinum loaded on supports can be in metallic form: Pt(0) or in ionic forms: Pt(II) and Pt(IV). The heterogeneous precious metal catalysts are obtained either from commercial resources or self-made following well-known procedures in literature. The precious metal loading on supports can range from 0.01 to 20%, preferably between 0.1% and 10%.

Hydrosilation reactions with heterogeneous catalysts can generally be carried out at a temperature between about 25° C. and about 200° C., preferably between about 80° C. and about 160° C. under a pressure of from about 0 psig to about 500 psig. When running the hydrosilation reactions in batch or CSTR process, a small amount of precious metal catalyst, e.g. between about 1 ppm Pt and about 5000 ppm Pt, can be used. Relatively low dosage (<50 ppm Pt equivalent) of heterogeneous catalyst is preferred to maximize the process economics (high Pt dosage will need more catalyst reuse times to make process economic). The reaction time can take from about 5 minutes to several days. When running the hydrosilation reactions in FBR process, the fixed-bed hydrosilation reactor is packed with the heterogeneous catalyst solids, and will be continuously operated for an extensive period of time until the catalysts finally lose reactivity. Hydrosilation conditions include a residence time of the liquid reaction medium to be contacted with said heterogeneous precious metal catalyst sufficient to achieve a satisfactory hydrosilation conversion, e.g., about 1 minute to about 24 hours. The fixed-bed hydrosilation reactor can be operated either in continuous single-pass mode (as shown in FIG. 1) or in batch recirculation mode (as shown in FIG. 2) depending on reaction rates and process preference. The average residence time calculations in FBR both for continuous single-pass mode and batch recirculation mode are shown below.

There are some additional benefits when using heterogeneous catalysts in continuous FBR: (1) production is continuous, thus manufacturing related costs can be significantly reduced; (2) high product output can be achieved with relatively small FBR; (3) much reduced footprint and much reduced investment of production units; (4) easy precious metal recovery since precious metals are retained in the FBR.

After the heterogeneous precious metal catalysts are consumed (lost reactivity), they can be incinerated such that the precious metals are recovered as elemental metal. Besides platinum-based heterogeneous catalyst, other precious metals (e.g., palladium, rhodium, rhenium . . . ) based heterogeneous catalysts can also be considered to achieve the goals of this invention.

By using the heterogeneous precious metal catalysts in hydrosilation reactions, the resulting organosilicon products showed very low precious metal content, much reduced color, and no black particle formation caused by slow precious metal precipitation. Thus, the quality of the resulting organosilicon products is significantly improved.

In an embodiment the organosilicon product provided by the invention can be as a component in an agricultural composition. Such agricultural compositions can include an agriculturally active component, for example, pesticide. Many pesticide applications require the addition of an adjuvant to the spray mixture to provide wetting and spreading on foliar surfaces. Often that adjuvant is a surfactant, which can perform a variety of functions, such as increasing spray droplet retention on difficult to wet leaf surfaces, enhance spreading to improve spray coverage, or to provide penetration of the herbicide into the plant cuticle. These adjuvants are provided either as a tank-side additive or used as a component in pesticide formulations.

Typical uses for pesticides include agricultural, horticultural, turf, ornamental, home and garden, veterinary and forestry applications.

The agricultural composition employing the organosilicon product of the present invention may also include excipients, co-surfactants, solvents, foam control agents, deposition aids, drift retardants, biologicals, micronutrients, fertilizers and the like. The term pesticide means any compound used to destroy pests, e.g., rodenticides, insecticides, miticides, fungicides, and herbicides. Illustrative examples of pesticides which can be employed include, but are not limited to, growth regulators, photosynthesis inhibitors, pigment inhibitors, mitotic disrupters, lipid biosynthesis inhibitors, cell wall inhibitors, and cell membrane disrupters. The amount of pesticide employed in compositions of the invention varies with the type of pesticide employed. More specific examples of pesticide compounds that can be used with the compositions of the invention are, but not limited to, herbicides and growth regulators, such as: phenoxy acetic acids, phenoxy propionic acids, phenoxy butyric acids, benzoic acids, triazines and s-triazines, substituted ureas, uracils, bentazon, desmedipham, methazole, phenmedipham, pyridate, amitrole, clomazone, fluridone, norflurazone, dinitroanilines, isopropalin, oryzalin, pendimethalin, prodiamine, trifluralin, glyphosate, glufosinate, sulfonylureas, imidazolinones, pyridinecarboxylic acids, clethodim, diclofop-methyl, fenoxaprop-ethyl, fluazifop-p-butyl, haloxyfop-methyl, quizalofop, sethoxydim, dichlobenil, isoxaben, and bipyridylium compounds.

Fungicide compositions that can be used with the present invention include, but are not limited to, aldimorph, tridemorph, dodemorph, dimethomorph; flusilazol, azaconazole, cyproconazole, epoxiconazole, furconazole, propiconazole, tebuconazole and the like; imazalil, thiophanate, benomyl carbendazim, chlorothialonil, dicloran, trifloxystrobin, fluoxystrobin, dimoxystrobin, azoxystrobin, furcaranil, prochloraz, flusulfamide, famoxadone, captan, maneb, mancozeb, dodicin, dodine, and metalaxyl.

Insecticide, larvacide, miticide and ovacide compounds that can be used with the composition of the present invention include, but are not limited to, *Bacillus thuringiensis*, spinosad, abamectin, doramectin, lepimectin, pyrethrins, carbaryl, primicarb, aldicarb, methomyl, amitraz, boric acid, chlordimeform, novaluron, bistrifluoron, triflumuron, diflubenzuron, imidacloprid, diazinon, acephate, endosulfan, kelevan, dimethoate, azinphos-ethyl, azinphos-methyl, izoxathion, chlorpyrifos, clofentezine, lambda-cyhalothrin, permethrin, bifenthrin, cypermethrin and the like.

The pesticide may be a liquid or a solid. If a solid, it is preferable that it is soluble in a solvent, or the organosilicon product of the present invention, prior to application, and the silicone may act as a solvent, or surfactant for such solubility or additional surfactants may perform this function.

Agricultural excipients useful in agricultural compositions in combination with the organosilicon product of the invention include buffers, preservatives and other standard excipients known in the art.

Solvents may also be included in agricultural compositions of the present invention. These solvents are in a liquid state at room temperature. Examples include water, alcohols, aromatic solvents, oils (i.e. mineral oil, vegetable oil, silicone oil, and so forth), lower alkyl esters of vegetable oils, fatty acids, ketones, glycols, polyethylene glycols, diols, paraffinics, and so forth. Particular solvents would be 2,2,4-trimethyl, 1-3-pentane diol and alkoxylated (especially ethoxylated) versions thereof as illustrated in U.S. Pat. No. 5,674,832 herein incorporated by reference, or n-methyl-pyrrilidone.

Also, the agricultural composition can include co-surfactants. Useful co-surfactants can optionally have short chain hydrophobes that do not interfere with superspreading as described in U.S. Pat. Nos. 5,558,806; 5,104,647; and 6,221,811, which are herein included by reference.

The co-surfactants useful herein include nonionic, cationic, anionic, amphoteric, zwitterionic, polymeric surfactants, or any mixture thereof. Surfactants are typically hydrocarbon based, silicone based or fluorocarbon based.

Useful surfactants include alkoxylates, especially ethoxylates, containing block copolymers including copolymers of ethylene oxide, propylene oxide, butylene oxide, and mixtures thereof; alkylarylalkoxylates, especially ethoxylates or propoxylates and their derivatives including alkyl phenol ethoxylate; arylarylalkoxylates, especially ethoxylates or propoxylates. and their derivatives; amine alkoxylates, especially amine ethoxylates; fatty acid alkoxylates; fatty alcohol alkoxylates; alkyl sulfonates; alkyl benzene and alkyl naphthalene sulfonates; sulfated fatty alcohols, amines or acid amides; acid esters of sodium isethionate; esters of sodium sulfosuccinate; sulfated or sulfonated fatty acid esters; petroleum sulfonates; N-acyl sarcosinates; alkyl polyglycosides; alkyl ethoxylated amines; and so forth.

Specific examples of surfactants include alkyl acetylenic diols (SURFONYL-Air Products), pyrrilodone based surfactants (e.g., SURFADONE-LP 100-ISP), 2-ethyl hexyl sulfate, isodecyl alcohol ethoxylates (e.g., RHODASURF DA 530-Rhodia), ethylene diamine alkoxylates (TETRONICS-BASF), and ethylene oxide/propylene oxide copolymers (PLURONICS-BASF) and Gemini type surfactants (Rhodia).

Preferred surfactants include ethylene oxide/propylene oxide copolymers (EO/PO); amine ethoxylates; alkyl polyglycosides; oxo-tridecyl alcohol ethoxylates, etc.

In an embodiment, the agricultural composition of the present invention comprises one or more agrochemical ingredients. Suitable agrochemical ingredients include, but are not limited to, herbicides, insecticides, growth regulators, fungicides, miticides, acaricides, fertilizers, biologicals, plant nutritionals, micronutrients, biocides, paraffinic mineral oil, methylated seed oils (i.e. methylsoyate or methylcanolate), vegetable oils (such as soybean oil and canola oil), water conditioning agents such as Choice® (Loveland Industries, Greeley, Colo.) and Quest (Helena Chemical, Collierville, Tenn.), modified clays such as Surround® (Englehard Corp.), foam control agents, surfactants, wetting agents, dispersants, emulsifiers, deposition aids, antidrift components, and water.

Suitable agrochemical compositions are made by combining, in a manner known in the art, such as, by mixing one or more of the above components with the organosilicon product of the present invention, either as a tank-mix, or as an "In-can" formulation. The term "tank-mix" means the addition of at least one agrochemical to a spray medium, such as water or oil, at the point of use. The term "In-can" refers to a formulation or concentrate containing at least one agrochemical component. The "In-can" formulation may then diluted to use concentration at the point of use, typically in a Tank-mix, or it may be used undiluted.

In an embodiment, the organosilicon product of the present invention may be utilized in personal care emulsions, such as lotions, and creams. As is generally known, emulsions comprise at least two immiscible phases one of which is continuous and the other which is discontinuous. Further emulsions may be liquids with varying viscosities or solids. Additionally, the particle size of the emulsions may be render them microemulsions and when sufficiently small microemulsions may be transparent. Further it is also possible to prepare emulsions of emulsions and these are generally known as multiple emulsions. These emulsions may be, for example:

1) aqueous emulsions where the discontinuous phase comprises water and the continuous phase comprises the organosilicon product of the present invention;

2) aqueous emulsions where the continuous phase comprises water and the discontinuous phase comprises the organosilicon product of the present invention;

3) non-aqueous emulsions where the discontinuous phase comprises a non-aqueous hydroxylic solvent and the continuous phase comprises the organosilicon product of the present invention; and 4) non-aqueous emulsions where the continuous phase comprises a non-aqueous hydroxylic organic solvent and the discontinuous phase comprises the organosilicon product of the present invention.

Non-aqueous emulsions comprising a silicone phase are described in U.S. Pat. Nos. 6,060,546 and 6,271,295 the disclosures of which are herewith and hereby specifically incorporated by reference.

As used herein the term "non-aqueous hydroxylic organic compound" means hydroxyl containing organic compounds exemplified by alcohols, glycols, polyhydric alcohols and polymeric glycols and mixtures thereof that are liquid at room temperature, e.g. about 25 degrees C., and about one atmosphere pressure. The non-aqueous organic hydroxylic solvents are selected from the group consisting of hydroxyl containing organic compounds comprising alcohols, glycols, polyhydric alcohols and polymeric glycols and mixtures thereof that are liquid at room temperature, e.g., about 25 degrees C., and about one atmosphere pressure. Preferably the non-aqueous hydroxylic organic solvent is selected from the group consisting of ethylene glycol, ethanol, propyl alcohol, iso-propyl alcohol, propylene glycol, dipropylene glycol, tripropylene glycol, butylene glycol, iso-butylene glycol, methyl propane diol, glycerin, sorbitol, polyethylene glycol, polypropylene glycol mono alkyl ethers, polyoxyalkylene copolymers and mixtures thereof.

Once the desired form is attained whether as a silicone only phase, an anhydrous mixture comprising the silicone phase, a hydrous mixture comprising the silicone phase, a water-in-oil emulsion, an oil-in-water emulsion, or either of the two non-aqueous emulsions or variations thereon, the resulting material is usually a cream or lotion with improved deposition properties and good feel characteristics. It is capable of being blended into formulations for hair care, skin care, antiperspirants, sunscreens, cosmetics, color cosmetics, insect repellants, vitamin and hormone carriers, fragrance carriers and the like.

The personal care applications where the organosilicon product of the present invention and the silicone compositions derived therefrom of the present invention may be employed include, but are not limited to, deodorants, antiperspirants, antiperspirant/deodorants, shaving products, skin lotions, moisturizers, toners, bath products, cleansing products, hair care products such as shampoos, conditioners, mousses, styling gels, hair sprays, hair dyes, hair color products, hair bleaches, waving products, hair straighteners, manicure products such as nail polish, nail polish remover, nails creams and lotions, cuticle softeners, protective creams such as sunscreen, insect repellent and anti-aging products, color cosmetics such as lipsticks, foundations, face powders, eye liners, eye shadows, blushes, makeup, mascaras and other personal care formulations where silicone components have been conventionally added, as well as drug delivery systems for topical application of medicinal compositions that are to be applied to the skin.

In a preferred embodiment, the personal care composition of the present invention further comprises one or more personal care ingredients. Suitable personal care ingredients include, for example, emollients, moisturizers, humectants, pigments, including pearlescent pigments such as, for example, bismuth oxychloride and titanium dioxide coated mica, colorants, fragrances, biocides, preservatives, antioxidants, anti-microbial agents, anti-fungal agents, antiperspirant agents, exfoliants, hormones, enzymes, medicinal compounds, vitamins, salts, electrolytes, alcohols, polyols, absorbing agents for ultraviolet radiation, botanical extracts, surfactants, silicone oils, organic oils, waxes, film formers, thickening agents such as, for example, fumed silica or hydrated silica, particulate fillers, such as for example, talc, kaolin, starch, modified starch, mica, nylon, clays, such as, for example, bentonite and organo-modified clays.

Suitable personal care compositions are made by combining, in a manner known in the art, such as, for example, by mixing, one or more of the above components with the organosilicon product. Suitable personal care compositions may be in the form of a single phase or in the form of an emulsion, including oil-in-water, water-in-oil and anhydrous emulsions where the silicone phase may be either the discontinuous phase or the continuous phase, as well as multiple emulsions, such as, for example, oil-in water-in-oil emulsions and water-in-oil-in water-emulsions.

In one useful embodiment, an antiperspirant composition comprises the organosilicon product of the present invention and one or more active antiperspirant agents. Suitable antiperspirant agents include, for example, the Category I active antiperspirant ingredients listed in the U.S. Food and Drug Administration's Oct. 10, 1993 Monograph on antiperspirant drug products for over-the-counter human use, such as, for example, aluminum halides, aluminum hydroxyhalides, for example, aluminum chlorohydrate, and complexes or mixtures thereof with zirconyl oxyhalides and zirconyl hydroxyhalides, such as for example, aluminum-zirconium chlorohydrate, aluminum zirconium glycine complexes, such as, for example, aluminum zirconium tetrachlorohydrex gly.

In another useful embodiment, a skin care composition comprises the organosilicon product, and a vehicle, such as, for example, a silicone oil or an organic oil. The skin care composition may, optionally, further include emollients, such as, for example, triglyceride esters, wax esters, alkyl or alkenyl esters of fatty acids or polyhydric alcohol esters and one or more of the known components conventionally used in skin care compositions, such as, for example, pigments, vitamins, such as, for example, Vitamin A, Vitamin C and Vitamin E, sunscreen or sunblock compounds, such as, for example, titanium dioxide, zinc oxide, oxybenzone, octylmethoxy cinnamate, butylmethoxy dibenzoylm ethane, p-aminobenzoic acid and octyl dimethyl-p-aminobenzoic acid.

In another useful embodiment, a color cosmetic composition, such as, for example, a lipstick, a makeup or a mascara composition comprises the organosilicon product, and a coloring agent, such as a pigment, a water soluble dye or a liposoluble dye.

In another useful embodiment, the compositions of the present invention are utilized in conjunction with fragrant materials. These fragrant materials may be fragrant compounds, encapsulated fragrant compounds, or fragrance releasing compounds that either the neat compounds or are encapsulated. Particularly compatible with the compositions of the present invention are the fragrance releasing silicon containing compounds as disclosed in U.S. Pat. Nos. 6,046,156; 6,054,547; 6,075,111; 6,077,923; 6,083,901; and 6,153,578; all of which are herein and herewith specifically incorporated by reference.

In an embodiment the organosilicon product provided by the invention can be used as a surfactant in polyurethane foams. Such organosilicon surfactants can be used for flexible polyurethane foams, rigid polyurethane foams, high resilience (molded) polyurethane foams, etc. Surfactants are used to modify the characteristics of foam polyurethane polymers. In foams, they are used to emulsify the liquid components, regulate cell size, and stabilize the cell structure to prevent collapse and sub-surface voids. Polyurethane products have many applications, and over three quarters of the global consumption of polyurethane products are in the form of foams. The main uses of flexible foams are in matresses, furniture, automotive seating, carpet underlay, textile padding, etc. Rigid foams are inside the metal and plastic walls of most refrigerators, freezers, or behind paper, metals and other surface materials in the case of thermal insulation panels in the construction sector. High resilence (molded) foams are widely used in high resilience foam cushions.

According to one embodiment of the invention the organosilicon product can be employed in the polyurethane foam-forming composition in an amount that ranges from 0.1 to 4.0 parts per 100 parts polyol of the foam-forming composition, and preferably in an amount that ranges from 0.5 to 2.0 parts per 100 parts of the polyol of the foam-forming composition.

Although the polyurethane foam can be provided by mechanical frothing or whipping of the foam-forming composition, according to an embodiment of the invention, a blowing agent can be added to the composition. Suitable blowing agents are well known in the art. Within the blowing agents, particularly useful are chemical blowing agents, e.g., water and formic acid. Blowing agents that are reactive with isocyanate and create gas upon reaction with isocyanate include compounds, such as, water, in an amount form 0 to 3 parts based on the 100 parts of the polyol material; and, formic acid, in an amount from 0 to 2 parts based on the 100 parts of the polyol material.

Other optional auxiliary blowing agents may be chemicals that volatilize or decompose giving a volatile gas due to heat. One embodiment of the use of such a blowing agent is one that would create a volatile gas during the cure of the foam by heat in an oven or other external heat-induced curing process. This additional blowing agent would be used to reduce foam density beyond that obtained by mechanically frothing and/or chemically blowing with isocyanate-reactive blowing agents.

Other optional ingredients include fillers, e.g., inorganic fillers or combinations of fillers in amounts known in the art. Fillers may include those for density modification, physical property improvements such as mechanical properties or sound absorption, fire retardancy or other benefits including those that may involve improved economics such as, for example, calcium carbonate or other fillers that reduce the cost of manufactured foam, aluminum trihydrate or other fire retardant fillers, barium sulfate or other high-density filler that is used for sound absorption, microspheres of materials such as glass or polymers that may also further reduce foam density. Fillers of high aspect ratio that are used to modify mechanical properties such as foam hardness or stiffness or flexural modulus that would include: man-made fibers such as milled glass fiber or graphite fiber; natural mineral fibers such as wollastonite; natural animal fibers such as wool or plant fibers such as cotton; man-made plate-like fillers such as shattered glass; natural mineral plate-like fillers such as mica; fiber reinforcement from a list including man-made fibers such as milled glass fiber, or graphite fiber, natural mineral fibers such as wollastonite, natural animal fibers such as wool, and/or natural plant fibers such as cotton, and/or plate-like reinforcements including man-made plate-like fillers such as shattered glass and/or natural mineral plate-like fillers such as mica. The polyurethane foam can include the addition of any pigments, tints or colorants as well as organic flame or fire retardants; antioxidants; thermal or thermal-oxidative degradation inhibitors, UV stabilizers, UV absorbers or any other additives that would added to prevent thermal, light, and/or chemical degradation; anti-static agents; anti-microbial agents; and gas-fade inhibiting agents.

The mechanical frothing operation of the polyurethane forming composition can be performed in high shear mixing equipment such as an Oakes mixer or Firestone mixer and similar equipment. According to one embodiment of the invention, the fine-celled polyurethane foam is prepared by a process utilizing high-shear mixing of the polyurethane foam-forming composition components herein to make mechanically frothed foam. Some of the components may be premixed into a pre-blend in a batch mixing process prior to addition of other components at the high-shear mixer. Further, the components may be premixed using a low shear mixer prior to entering a high shear mixer or mixing process. Furthermore, some components may be added into the high shear mixing process or mixer at the same location as other components enter in the mixhead or in locations within the mixer that represent various degrees of completion of the mixing process. The frothed polyurethane foam containing the organosilicon product of the present invention is cured (i.e., completing the urethane and possibly urea reactions) by known and conventional means.

Gas such as air, nitrogen, carbon dioxide can be injected into the mixing of components or entrained through capture from above the surface of mixed components. The gas can also be injected into the high-shear mixer through pressure. Mixers include the aforementioned or other similar equipment that produce high shear conditions during mixing.

The uses of the compositions of the present invention are not restricted to agricultural, personal care compositions, and polyurethane foam compositions. Other applications, such as oil and gas production, waxes, polishes and textiles treated with the compositions of the present invention are also contemplated.

Home care applications include laundry detergent and fabric softener, dishwashing liquids, wood and furniture polish, floor polish, tub and tile cleaners, toilet bowl cleaners, hard surface cleaners, window cleaners, antifog agents, drain cleaners, auto-dish washing detergents and sheeting agents, carpet cleaners, prewash spotters, rust cleaners and scale removers.

The organosilicon product of the invention can also be used as a component in a plastic additive composition where such organosilicon based plastics additives can significantly improve the transparency of the plastic materials.

The following setups were used in the Examples set forth below.

Batch Experiments Setup

To a 4-neck flask equipped with mechanical stir, nitrogen purge, water condenser, and thermocouple for temperature control, the calculated amounts of reactants and suitable amount of heterogeneous catalyst solids were charged. The reaction was carried out at a controlled temperature and pressure for a controlled time.

Fixed-Bed Experiments Setup

Here are specifications of the lab fixed-bed hydrosilylation equipment: in the feeding reservoir, the calculated amounts of reactants were charged and well mixed with a mechanic stirring system. The well-mixed mixture was fed through the feeding line and a pump (with a set feeding rate), into the top of the fixed-bed column. The column was set at a certain temperature and the inside packed heterogeneous solid catalysts could catalyze the hydrosilylation reactions. There was a little pre-heating section before raw materials went into the fixed-bed reactor. The fixed-bed was designed with two different operating modes: either continuous single-pass mode or batch recirculation mode (controlled by a three-way valve). There was a pressure gauge in front of the column inlet (top) to watch the pressure drop inside the fixed-bed column. The outlet of the column (bottom) was open to atmosphere with $N_2$ by-pass for protection. There was a pressure relief valve in front of the column inlet (top) to prevent significant pressure buildup inside the column. The feeding reservoir also had $N_2$ by-pass for protection.

The fixed-bed column was a small stainless steel column with a thermocouple in the middle of the reactor for temperature control. The column was covered with the heating tape. The heating tape, along with the thermocouple and the temperature controller could control the temperature of the fixed-bed column. The column had an inner diameter of 1.5 cm and effective packing length of 14 cm. The total effective packing volume was around 24.7 $cm^3$. The weight of the packed heterogeneous solid catalyst (3.6 wt. % Pt/Silica spheres from Johnson Matthey) was 12.55 g with a packing density of around 0.508 $g/cm^3$. The catalyst spheres have the particle size of around 1 mm (diameter). Stainless steel beads, glass wools, and retaining screens existed at both ends of the column to provide uniform liquid flow distribution in column and for retaining purpose. In lab experiments, a layer of stainless steel beads were used at the inlet section (top) to provide uniform and even liquid flow distribution inside the whole column.

The following terminologies are used in this disclosure:

Conversion of the organosiloxane hydrosilation reactions is calculated based on the following equation (1):

$$\text{Conversion} = \frac{\text{Initial SiH content in reaction mixture} - \text{Final SiH content in reaction mixture}}{\text{Initial SiH content in reaction mixture}} \quad [1]$$

When using fixed-bed hydrosilation process, for continuous single-pass mode, "Space Time" is calculated based on the following equation (2):

$$\text{Space Time} = \frac{\text{Total Volume of Fixed Bed Reactor}}{\text{Liquid Stream Flow Rate}} \quad [2]$$

Note that "Space Time" here is not the actual "Residence Time". For a definition of "Residence Time", the numerator should be the "void space of the fixed bed reactor" instead of the "total volume of the fixed bed reactor". However, since we didn't measure the exact void space of the fixed bed reactor, "Space Time" is used to define residence time here as shown in Equation (2). "Space Time" calculated here is more than the actual "Residence Time".

When using fixed-bed hydrosilation process, for continuous single-pass mode, "Space Time Yield" is calculated based on the following equation (3):

$$\text{Space Time Yield} = \frac{\text{Liquid Stream Flow Rate}}{\text{Weight of Packed Catalyst Beads}} \quad [3]$$

When using fixed-bed hydrosilation process, for batch recirculation mode, "Space Time" is calculated based on the following equation (4):

$$\text{Space Time} = \frac{\text{Total Volume of Fixed Bed} \times \text{Total Recirculation Time}}{\text{Volume of Batch}} \quad [4]$$

Note that "Space Time" here is not the actual "Residence Time". For a definition of "Residence Time", the numerator should be the "void space of the fixed bed reactor" instead of the "total volume of the fixed bed reactor". However, since we didn't measure the exact void space of the fixed bed reactor, "Space Time" is used to define residence time here as shown in Equation (4). "Space Time" calculated here is more than the actual "Residence Time".

When using fixed-bed hydrosilation process, for batch recirculation mode, "Space Time Yield" is calculated based on the following equation (5):

$$\text{Space Time Yield} = \frac{\text{Weight of Batch}}{\text{Total Recirculation Time} \times \text{Weight of Packed Catalyst Beads}} \quad [5]$$

The heterogeneous catalysts employed in the invention were obtained from the following sources:
  5 wt. % Pt/Alumina powders from Johnson Matthey
  3.6 wt. % Pt(0)/Silica spheres (~1 mm) from Johnson Matthey
  5.75 wt. % Pt(IV)/Silica particles (315-500 µm (particle size data from vendor)): Self-Made in accordance with the following procedure:
  5.12 grams of functionalized silica gel type mircroporous support material (particle size: 315-500 µm, Resource: from PhosphonicS™ Ltd.), 138.39 grams of ethanol, and 0.915 grams of chloroplatinic acid hydrate solid (40.06% Pt) were well mixed in a pot and the mixture was refluxed at 78° C. for 3 hrs. The resulting solid catalyst was filtered and washed with ethanol for 1 time and methanol for additional 3 times. The resulting solid catalyst was vacuum dried at 80° C. for 2 hrs, and finally 5.33 grams of solid catalyst was obtained. The resulting solid catalyst has platinum loading of 5.75 wt. % on functionalized silica gel, analyzed using Inductively Coupled Plasma Mass Spectroscopy.

Color is measured by Pt/Co values as determined by ASTM D1209.

The following are the chemical structures of the reactants used in the Examples below.

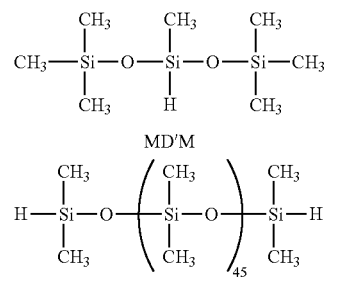

MD'M

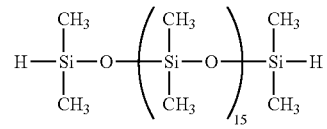

M'D$_{45}$M'

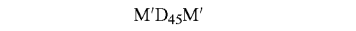

APEG-350-OMe

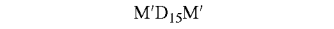

M'D$_{15}$M'

APEG-350R

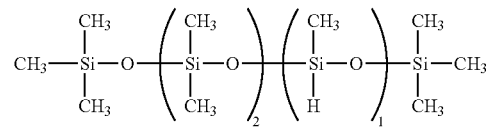

MD$_2$D'$_1$M

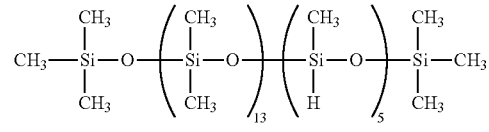

MD$_{13}$D'$_5$M

EXAMPLES

The invention is illustrated but not limited by the following Examples. The Comparative Examples are provided for comparison purposes but do not illustrate the invention.

Comparative Example 1

This Comparative Example was conducted as a batch process
Reactants: MD'M (206 grams) and 1-Octene (113 grams, in excess)
Catalyst: 3.3% Chloroplatinic acid (CPA, $H_2PtCl_6 \cdot 6H_2O$) in ethanol solution (0.128 gram, 5 ppm Pt equivalent)
Reaction Temp.: 80-90° C.
Pressure: atmospheric pressure
Procedure: MD'M was introduced into the batch reactor first, and heated to 80° C. Right after adding CPA catalyst, 1-octene was fed into the reactor with control of the exotherm of the reaction. After 1-octene addition, the reactor was held at 80° C. for an additional 2 hours to complete reaction.
Results:
  Conversion: 86.2%
  Product Color: 110 Pt/Co
  Pt content in filtered product: 5 ppm
  1-Octene isomerization: 5.36% of initial total 1-octene
  (1) The reaction showed lower conversion since CPA catalyst lost reactivity at the end of the reaction and additional CPA charge would be needed to make the reaction go to completion. (2) The product showed high color and high platinum content. (3) Black particle formation was observed after storage of the sample for months and sometimes in as little as days, which can result in significant customer complaints. (4) Platinum was left in the product, which resulted in significant precious metal loss.

Example 1A

This Example illustrates the invention and was conducted as a batch process.
Reactants: MD'M (412 grams) and 1-octene (226 grams, in excess)
Catalyst: 3.6% Pt(0)/Silica spheres from Johnson Matthey (0.09 gram of solid beads, 5 ppm Pt equivalent)
Reaction Temp.: 110° C.
Pressure: atmospheric pressure
Procedure: MD'M and catalyst beads were introduced into the batch reactor first, and heated to 110° C. 1-Octene was fed into the reactor with control of the exotherm of the reaction. After 1-octene addition, the reactor was held at 110° C. for an additional 1-2 hours to complete reaction.
Results:
  Conversion: 99.8%
  Product Color: 6 Pt/Co
  Pt content in filtered product: 0.19 ppm
  1-Octene isomerization: 5.07% of initial total 1-octene
  (1) The reaction showed very high conversion since heterogeneous catalyst did not lose reactivity during the reaction. (2) The product showed very low color and very low platinum content. (3) Black particle formation over time and customer complaints can be eliminated. (4) Platinum can be reused or recovered by incineration, which could generate significant cost savings. (5) Using heterogeneous catalyst instead of CPA, slightly reduced 1-octene isomerization was observed.

Example 1B

This Example illustrates the invention and was conducted as a fixed bed process with batch recirculation mode as illustrated in FIG. 2.
Reactants in Batch: MD'M (653 grams) and 1-octene (347 grams, in excess).
Total Batch Size: 1000 grams or 1282 cm$^3$
Catalyst Packed in Fixed-Bed: 3.6% Pt(0)/Silica spheres from Johnson Matthey
Total Packing Volume of Fixed Bed: 24.7 cm$^3$
Weight of Packed Catalyst: 12.55 grams
Packing Density: 0.508 g/cm$^3$
Fixed-Bed Reactor Temp.: 110° C.
Pressure: atmospheric pressure
Mixture Recirculation Rate: 2.68 grams/min or 3.44 cm$^3$/min
Total Recirculation Time: 53.5 hrs.
Results:
  Conversion: 98.4%
  Product Color: 3 Pt/Co
  Pt content in product: 0.27 ppm
  Space Time: 61.8 min
  Space Time Yield: 1.49 g product/(hour·g catalyst bead)

Comparative Example 2

This Comparative Example was conducted as a batch process
Reactants: M'D$_{45}$M' (364 grams) and Eugenol (36 grams, in excess)
Catalyst: 3.3% Chloroplatinic acid (CPA, H$_2$PtCl$_6$.6H$_2$O) in ethanol solution (0.08 gram, 2.5 ppm Pt equivalent)
Reaction Temp.: 90° C.
Pressure: atmospheric pressure
Procedure: M'D$_{45}$M' and Eugenol were introduced into the batch reactor, and heated to 90° C. After the temperature reached 90° C., CPA catalyst was added, and the reactor exotherms rose to 116° C. After exotherm of the reaction, the reactor was held at 90° C. for an additional 1.5 hrs. to complete reaction.
Results:
  Conversion: 99.9%
  Product Color: 120 Pt/Co
  Pt content in filtered product: 2.5 ppm
  Eugenol isomerization: 9.5% of initial total Eugenol
  (1) The product showed high color and high platinum content. (2) Black particle formation can be observed after storage of the sample for months and sometimes days, which can result in significant customer complaints. (3) Platinum was left in the product, which resulted in significant precious metal loss.

Example 2A

This Example illustrates the invention and was conducted as a batch process
Reactants: M'D$_{45}$M' (1093 grams) and Eugenol (107 grams, in excess)
Catalyst: 3.6% Pt(0)/Silica spheres from Johnson Matthey (0.084 gram of solid beads, 2.5 ppm Pt)
Reaction Temp.: 120° C.
Pressure: atmospheric pressure
Procedure: M'D$_{45}$M', Eugenol, and catalyst beads were introduced into the batch reactor, and heated to 120° C. After exotherm of the reaction, reactor was held at 120° C. for an additional 1-2 hrs to complete the reaction.
Results:
  Conversion: 96.8%
  Product Color: 6 Pt/Co
  Pt content in filtered product: 0.02 ppm
  Eugenol isomerization: 0.9% of initial total Eugenol
  (1) The product showed very low color and very low platinum content. (2) Black particle formation over time and customer complaints can be eliminated. (3) Platinum can be reused or recovered by incineration, which could generate significant cost savings. (4) Using heterogeneous catalyst instead of CPA, Eugenol isomerization was significantly reduced. Thus, less Eugenol excess can be used, which could generate significant raw material savings and significantly reduced waste generation.

Example 2B

This Example illustrates the invention and was conducted in a fixed-bed process with batch recirculation mode as illustrated in FIG. 2.

Reactants in Batch: M'D$_{45}$M' (915 grams) and Eugenol (85 grams, in excess)

Total Batch Size: 1000 grams or 1044 cm$^3$

Catalyst Packed in Fixed-Bed: 3.6% Pt(0)/Silica spheres from Johnson Matthey

Total Volume of Fixed Bed: 24.7 cm$^3$

Weight of Packed Catalyst: 12.55 grams

Packing Density: 0.508 g/cm$^3$

Fixed-Bed Reactor Temperature: 110° C.

Pressure: atmospheric pressure

Mixture Recirculation Rate: 2.75 grams/min or 2.87 cm$^3$/min

Total Recirculation Time: 25 h

Results:
  Conversion: 97.6%
  Product Color: 13 Pt/Co
  Pt content in product: 0.24 ppm
  Eugenol isomerization: 2.15% of initial total Eugenol
  Space Time: 35.5 min
  Space Time Yield: 3.19 g product/(hour·g catalyst bead)

Example 2C

This Example illustrates the invention and was conducted in a fixed-bed process with continuous single-pass mode as illustrated in FIG. 1. This Example was conducted in three parts.

Part I:

Reactant Mixture: M'D$_{45}$M' and Eugenol (in 10% mole excess of its stoichiometric value)

Catalyst Packed in Fixed-Bed: 3.6% Pt(0)/Silica spheres from Johnson Matthey

Total Volume of Fixed Bed: 24.7 cm$^3$

Weight of Packed Catalyst: 12.55 grams

Packing Density: 0.508 g/cm$^3$

Pressure: atmospheric pressure

Fixed-Bed Reactor Temperature: 132° C.

The reaction was carried out using three different feed rates as shown in Table 1 below:

TABLE 1

| Reactant Mixture Feed Rate g/min (cm$^3$/min) | 2.46 (2.57) | 3.00 (3.13) | 3.44 (3.59) |
|---|---|---|---|
| Space Time (minutes) | 9.6 | 7.9 | 6.9 |
| Conversion | 96.70% | 96.02% | 95.12% |
| Space Time Yield (g product/(hour · g catalyst bead)) | 11.76 | 14.34 | 16.45 |
| Eugenol Isomerization (of initial total Eugenol) | 1.41% | N/A | 1.50% |

In continuous single-pass mode operation, increased feed rate (reduced space time) resulted in reduced conversion.

Part II:

The same reaction as part I except that the Eugenol was in 7.2 mol % excess of its stoichiometric value, and Reactant Mixture Feed Rate: 2.40 g/min or 2.51 cm$^3$/min, Space Time=9.8 minutes, Space Time Yield=11.47 g product/(hour g catalyst bead)

The reaction was conducted at three different temperatures with results as shown in Table 2:

TABLE 2

| | Fixed Bed Reactor Temperature | | |
|---|---|---|---|
| | 132° C. | 140° C. | 150° C. |
| Conversion | 95.61% | 97.01% | 97.37% |
| Eugenol Isomerization (of initial total Eugenol) | 1.32% | 1.64% | 1.84% |

As can be seen from Table 2, in continuous single-pass mode operation, increased reaction temperature resulted in increased conversion and increased Eugenol isomerization.

Part III:

The same reaction as Part I except:

Fixed-Bed Reactor Temp.: 140° C.

Reactant Mixture Feed Rate: 2.50 g/min or 2.61 cm$^3$/min,

Space Time: 9.5 minutes,

Space Time Yield: 11.95 g product/(hour·g catalyst bead)

The reaction was conducted with three different excess amounts of Eugenol. The results are shown in Table 3:

TABLE 3

| | Eugenol mol % Excess of its Stoichiometric Value | | |
|---|---|---|---|
| | 5 mol % | 10 mol % | 15 mol % |
| Conversion | 94.31% | 97.48% | 98.86% |
| Eugenol Isomerization (of initial total Eugenol) | 1.58% | 1.83% | N/A |

In continuous single-pass mode operation, increased excess amount of Eugenol resulted in increased conversion. The Space Time Yield in the batch recirculation mode is much lower compared to the Space Time Yield in the continuous single-pass mode; and the Space Time in the batch recirculation mode is much longer compared to the Space Time in the continuous single-pass mode. This is attributed to the fact that in the batch recirculation mode, we kept feeding both the raw materials and synthesized product into the fixed-bed instead of only the raw materials as in the continuous single-pass mode. Particularly, at the later stage of the process in the batch recirculation mode, most of the feeding material going into the fixed-bed was the synthesized product instead of raw materials, which significantly lowered the fixed-bed capacity and efficiency. Thus, much longer Space Time and lower Space Time Yield will be expected in the batch recirculation mode compared to the continuous single-pass mode as we have seen in Examples 2B and 2C.

There are some additional benefits when using heterogeneous catalysts in continuous FBR: (1) production is continuous, thus manufacturing related costs can be significantly reduced; (2) high product output can be achieved with relatively small FBR; (3) much reduced footprint and much reduced investment of production units; (4) easy precious metal recovery since precious metals are retained in FBR.

Comparative Example 3

This Comparative Example was performed as a batch process.
Reactants: MD'M (100 grams) and polyether APEG-350-OMe (250 grams, in excess)
Catalyst: 3.3% Chloroplatinic acid (CPA, $H_2PtCl_6 \cdot 6H_2O$) in ethanol solution (0.281 gram, 10 ppm Pt equivalent)
Reaction Temp.: 90° C.
Pressure: atmospheric pressure
Procedure: Polyether APEG-350-OMe was introduced into the batch reactor first, then heated to 90° C. Thereafter CPA catalyst was added, and MD'M was fed into the system with control of the exotherm of the reaction. After MD'M addition, reactor was held at 90° C. for an additional 1.5 hrs. to complete the reaction.
Results:
  Conversion: 99.6%
  Product Color: 470 pt./co
  Pt content in filtered product: 10 ppm
  (1) The product showed high color and high platinum content. (2) Black particle formation was observed after storage of the sample for months and sometimes days, which can result in significant customer complaints. (3) Platinum was left in the product, which resulted in significant precious metal loss.

Example 3

This Example illustrates the invention and was conducted in a batch process.
Reactants: MD'M (100 grams) and polyether APEG-350-OMe (250 grams, in excess)
Catalyst: 3.6% Pt(0)/Silica spheres from Johnson Matthey (0.09 gram of solid beads, 9.3 ppm Pt)
Reaction Temp.: 130° C.
Pressure: atmospheric pressure
Procedure: Polyether APEG-350-OMe and catalyst beads were first introduced into the batch reactor, heated to 130° C. Then MD'M was fed into the reactor with control of the exotherm of the reaction. After MD'M addition, the reactor was held at 130° C. for an additional 3-5 hrs to complete reaction.
Results:
  Conversion: 99.3%
  Product Color: 39 Pt/Co
  Pt content in filtered product: 0.98 ppm
  (1) The product showed very low color and very low platinum content. (2) Black particle formation over time and customer complaints can be eliminated. (3) Platinum can be reused or recovered by incineration, which could generate significant cost savings.

Comparative Example 4

This Comparative Example was performed as a batch process.
Reactants: M'$D_{15}$M' (147 grams) and APEG-350R (125 grams, in excess), 0.082 gram (300 ppm) of Dibutylaminoethanol (DBAE) as buffer
Catalyst: 3.3% Chloroplatinic acid (CPA, $H_2PtCl_6 \cdot 6H_2O$) in ethanol solution (0.11 gram, 5 ppm Pt equivalent)
Reaction Temp.: 90° C.
Pressure: atmospheric pressure
Procedure: M'$D_{15}$M', APEG-350R, and DBAE were introduced into the batch reactor, and heated to 85° C. After the temperature reached 85° C., CPA catalyst was added, and the reactor exotherm rose up to 122° C. After exotherm of the reaction, the reactor was held at 90° C. for an additional 1.5 hrs. to complete the reaction.
Results:
  Conversion: 100%
  Product Color: 120 Pt/Co
  Pt content in filtered product: 5 ppm
  (1) The product showed high color and high platinum content. (2) Black particle formation can be observed after storage of the sample for months and sometimes days, which can result in significant customer complaints. (3) Platinum was left in the product, which resulted in significant precious metal loss.

Example 4A

This Example illustrates the invention and was performed as a batch process.
Reactants: M'$D_{15}$M' (294 grams) and APEG-350R (249 grams, in excess), 0.163 gram (300 ppm) of Dibutylaminoethanol (DBAE) as buffer
Catalyst: 3.6% Pt(0)/Silica spheres from Johnson Matthey (0.076 gram of solid beads, 5 ppm Pt)
Reaction Temp.: 130° C.
Pressure: atmospheric pressure
Procedure: M'$D_{15}$M', APEG-350R, DBAE, and catalyst beads were introduced into the batch reactor, and heated to 130° C. After exotherm of the reaction, the reactor was held at 130° C. for an additional 3-5 hrs to complete reaction.
Results:
  Conversion: 99.3%
  Product Color: 13 Pt/Co
  Pt content in filtered product: 0.45 ppm
  (1) The product showed very low color and very low platinum content. (2) Black particle formation over time and customer complaints can be eliminated. (3) Platinum can be reused or recovered by incineration, which could generate significant cost savings.

Example 4B

This Example illustrates the invention and was conducted as a fixed-bed process with batch recirculation mode as illustrated in FIG. 2.
Reactants in Batch: M'$D_{15}$M' (503 grams) and APEG-350R (425 grams, in excess), 0.28 gram (300 ppm) of Dibutylaminoethanol (DBAE) as buffer
Total Batch Size: 928 grams or 926 cm³
Catalyst Packed in Fixed-Bed: 3.6% Pt(0)/Silica spheres from Johnson Matthey
Total Volume of Fixed Bed: 24.7 cm³
Weight of Packed Catalyst: 12.55 grams
Packing Density: 0.508 g/cm³
Fixed-Bed Reactor Temp.: 130° C.
Pressure: atmospheric pressure
Mixture Recirculation Rate: 2.50 grams/min or 2.49 cm³/min
Total Recirculation Time: 100 hrs.
Results:
  Conversion: 99.3%
  Product Color: 35 Pt/Co
  Pt content in product: 0.37 ppm
  Space Time: 160 min
  Space Time Yield: 0.74 g product/(hour·g catalyst bead)

Comparative Example 5

This Comparative Example was performed as a batch process.
Reactants: $MD_2D'_1M$ (137 grams) and allyl methoxy triethylene glycol ether (106 grams, in excess)
Catalyst: 3.3% Chloroplatinic acid (CPA, $H_2PtCl_6 \cdot 6H_2O$) in ethanol solution (0.195 gram, 10 ppm Pt equivalent)
Reaction Temp.: 90° C.
Pressure: atmospheric pressure
Procedure: Allyl methoxy triethylene glycol ether was introduced into the batch reactor first, then heated to 90° C. Right after adding CPA catalyst, $MD_2D'_1M$ was fed into the reactor with control of the exotherm of the reaction. After $MD_2D'_1M$ addition, the reactor was held at 90° C. for an additional 1.5 hrs to complete reaction.
Results:
Conversion: 100%
Product Color: 200 Pt/Co
Pt content in filtered product: 10 ppm
(1) The product showed high color and high platinum content. (2) Black particle formation was observed after storage of the sample for months and sometimes days, which can result in significant customer complaints. (3) Platinum was left in the product, which resulted in significant precious metal loss.

Example 5

This Example was performed as a batch process.
Reactants: $MD_2D'_1M$ (274 grams) and allyl methoxy triethylene glycol ether (211 grams, in excess)
Catalyst: 5.75% Pt(IV)/Silica particles, Self-Synthesized (0.085 gram of solid particles, 10 ppm Pt)
Reaction Temp.: 120-130° C.
Pressure: atmospheric pressure
Procedure: Allyl methoxy triethylene glycol ether and catalyst solids were introduced into the batch reactor first, and heated to 120° C. Then $MD_2D'_1M$ was added with control of the exotherm of the reaction. After $MD_2D'_1M$ addition, the reactor was held at 120° C. for an additional 3-5 hrs. to complete the reaction.
Results:
Conversion: 99.4%
Product Color: 26 Pt/Co
Pt content in filtered product: 0.85 ppm
(1) The product showed very low color and very low platinum content. (2) Black particle formation over time and customer complaints can be eliminated. (3) Platinum can be reused or recovered by incineration, which could generate significant cost savings.

Comparative Example 6

This Comparative Example was performed as a batch process.
Reactants: $MD_{13}D'_5M$ (100 grams) and APEG-350R (190 grams, in excess), 0.087 gram (300 ppm) of Dibutylaminoethanol (DBAE) as buffer
Catalyst: 3.3% Chloroplatinic acid (CPA, $H_2PtCl_6 \cdot 6H_2O$) in ethanol solution (0.47 gram, 20 ppm Pt equivalent)
Reaction Temp.: 90° C.
Pressure: atmospheric pressure
Procedure: Polyether APEG-350R and DBAE were introduced into the batch reactor first, then heated to 90° C. Thereafter CPA catalyst was added, and $MD_{13}D'_5M$ was fed into the system with control of the exotherm of the reaction. After $MD_{13}D'_5M$ addition, reactor was held at 90° C. for an additional 1 hour to complete the reaction.
Results:
Conversion: 100%
Product Color: 330 Pt/Co
Pt content in filtered product: 20 ppm
(1) The product showed high color and high platinum content. (2) Platinum was left in the product, which resulted in significant precious metal loss.

Example 6

This Example illustrates the invention and was performed as a batch process.
Reactants: $MD_{13}D'_5M$ (100 grams) and APEG-350R (190 grams, in excess), 0.087 gram (300 ppm) of Dibutylaminoethanol (DBAE) as buffer
Catalyst: 5% Pt/Alumina from Johnson Matthey (0.116 gram of solid powder, 20 ppm Pt)
Reaction Temp.: 130° C.
Pressure: atmospheric pressure
Procedure: Polyether APEG-350R, DBAE and catalyst solids were first introduced into the batch reactor, heated to 130° C. Then $MD_{13}D'_5M$ was fed into the reactor with control of the exotherm of the reaction. After $MD_{13}D'_5M$ addition, the reactor was held at 130° C. for an additional 5 hrs to complete reaction.
Results:
Conversion: 99.8%
Product Color: 20 Pt/Co
Pt content in filtered product: 0.8 ppm
(1) The product showed very low color and very low platinum content. (2) Platinum can be reused or recovered by incineration, which could generate significant cost savings.

Comparative Example 7

This Comparative Example was performed as a batch process.
Reactants: Triethoxysilane (44.9 grams) and 1-octene (33.7 grams, in excess), 0.25 gram of acetic acid as catalyst promoter
Catalyst: 3.3% Chloroplatinic acid (CPA, $H_2PtCl_6 \cdot 6H_2O$) in ethanol solution (0.13 gram, 20.6 ppm Pt equivalent)
Reaction Temp.: 85-90° C.
Pressure: atmospheric pressure
Procedure: Triethoxysilane and CPA catalyst were introduced into the batch reactor first, and heated to 85° C. 1-Octene and acetic acid were added through an addition syringe after the temperature reached 85° C., with control of the exotherm of the reaction. After 1-octene/acetic acid addition, the reactor was held at 85° C. for additional 1-2 hrs. to complete the reaction.
Results:
Final Product Mixture Composition:

| | |
|---|---|
| 1-Octene | 1.178% |
| Octene Isomers | 5.902% |
| Triethoxysilane | 0.000% |

| | |
|---|---|
| Tetraethoxysiane | 4.270% |
| Octyltriethoxysilane Product | 84.005% |
| Heavies | 2.841% |

Product Color: 390 Pt/Co
Pt content in filtered product: 20.6 ppm (1) The product showed high color and high platinum content. (2) Platinum left in the product, which resulted in significant precious metal loss. (3) After hydrosilation and light stripping (light stripping removed low boiling point components from product mixture such as 1-octene, octene isomers, tetraethoxysilane etc. to obtain a high purity octyltriethoxysilane product), the octyltriethoxysilane product already met purity requirements. However, octyltriethoxysilane product showed high color, i.e., color above 30 Pt/Co, due to the presence of platinum. As a result, the octyltriethoxysilane product needed a heavy distillation step for removing platinum and color by distilling the product and leaving platinum in a heavy stream to separate the octyltriethoxysilane product and platinum. In addition, product yield was lost since some of the product remained in the heavy stream and became waste. As is well known, a distillation process requires significant energy consumption due to the heating and vacuum required, which causes significant additional manufacturing costs. Thus, the additional heavy distillation step reduced product yield and significantly increased final product cost.

Example 7

This Example illustrates the invention and was performed as a batch process.
Reactants: Triethoxysilane (43.8 grams) and 1-octene (32.7 grams, in excess), 0.27 gram of acetic acid as catalyst promoter
Catalyst: 5% Pt/Alumina from Johnson Matthey (0.035 gram of solid powder, 22.9 ppm Pt)
Reaction Temp.: 110° C.
Pressure: atmospheric pressure
Procedure: Triethoxysilane and Pt/Alumina solid catalyst were introduced into the batch reactor first, then heated to 110° C. Then 1-Octene and acetic acid were added through an addition syringe after the temperature reached 110° C., with control of the exotherm of the reaction. After 1-octene/acetic acid addition, the reactor was held at 110° C. for an additional 2 hrs. to complete the reaction.
Results:
Final Product Mixture Compostion:

| | |
|---|---|
| 1-Octene | 3.188% |
| Octene Isomers | 3.486% |
| Triethoxysilane | 0.461% |
| tetraethoxysiane | 2.234% |
| Octyltriethoxysilane Product | 85.348% |
| Heavies | 3.813% |

Product Color: 14 Pt/Co
Pt content in filtered product: 1.47 ppm (1) The product showed very low color and very low platinum content. (2) Platinum can be reused or recovered by incineration, which could generate significant cost savings. (3) Using heterogeneous catalyst instead of CPA, octene isomerization was reduced. Thus, less octene excess can be used, which could generate significant raw material savings and significantly reduced waste generation. (4) Using heterogeneous catalyst instead of CPA, by-product tetraethoxysilane was reduced and product octyltriethoxysilane purity was improved. Thus, product yield can be improved and waste generation can be reduced. (5) Using heterogenous catalyst instead of CPA, the resulting octyltriethoxysilane product showed much reduced color. Thus, a costly heavy distillation step is not needed and avoided (only need a light stripping step to remove lights as discussed before). As a result, product yield was increased and product manufacturing cost was significantly reduced compared to manufacturing processes of octyltriethoxysilane which include a heavy distillation step.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

What is claimed is:

1. A process for manufacturing an organosilicon product having as stabilized low color and no formation of black particles during storage, the process comprising the steps of
   a) reacting an unsaturated compound with a silicon compound having a reactive Si—H bond under hydrosilylation conditions in a reaction zone in the presence of a heterogeneous precious metal catalyst to provide an organosilicon product having a color of less than 40 pt/co, wherein the unsaturated compound is 1-octene or Eugenol;
   b) separating the heterogeneous precious metal catalyst from the organosilicon product; and
   c) recovering the heterogeneous precious metal catalyst, wherein the organosilicon product is a component in at least one of a personal care composition, an agricultural composition, a home care composition, a polyurethane foam composition, or a plastic additive composition.

2. The process of claim 1 wherein steps (b) and (c) are performed without the use of distillation or devolatilization.

3. The process of claim 1 wherein the color of the product is less than 30 pt/co.

4. The process of claim 1 wherein the color of the product is less than 20 pt/co.

5. The process of claim 1 wherein the color of the product is less than 10 pt/co.

6. The process of claim 1 wherein the silicon compound is a silane having the formula:

$$(R^1)_u(R^2O)_vX_wSiH_{4-u-v-w}$$

wherein
$R^1$ and $R^2$ can be the same or different alkyl groups having from 1 to 5 carbon atoms
X is a halogen element,
u=0 to 3,
v=0 to 3,
w=0 to 3, provided that u+v+w is at least 1 and at the most 3.

7. The process of claim 6 wherein the slime is triethoxysilane wherein $R^2$ is ethyl, u is 0, v is 3 and w is 0.

8. The process of claim 1 wherein the silicon compound is a siloxane having the formula:

$$(M)_a(M')_b(D)_c(D')_d(M)_e(M')_f$$

wherein
M=(R³)(R⁴)(R⁵)SiO_{1/2},
M'=(R⁶)(R⁷)HSiO_{1/2},
D=(R⁸)(R⁹)SiO_{2/2},
D'=)(R¹⁰)HSiO_{2/2}
and
R³, R⁴, R⁵, R⁶, R⁷, R⁸, R⁹ and R¹⁰ can be the same or different alkyl or alkoxy groups having from 1 to 5 carbon atoms,
a=0 or 1
b=0 or 1, provided that a+b=1
c=0 to 100
d=0 to 100, provided that c+d is at least 1
e=0 or 1, and
f=0 or 1, provided that e+f=1.

9. The process of claim 8 wherein the silicon compound has the formula MD'M wherein R³, R⁴, R⁵ and R¹⁰ are each methyl, a is 1, c is 0, d is 1 and e is 1.

10. The process of claim 8 wherein the silicon compound has the formula M'D_{45}M' wherein R⁶, R⁷, R⁸ and R⁹ are each methyl, b is 1, c is 45, d is 0 and f is 1.

11. The process of claim 8 wherein the silicon compound has the formula M'D_{15}M' wherein R⁶, R⁷, R⁸ and R⁹ are each methyl, b is 1, c is 15, d is 0 and f is 1.

12. The process of claim 8 wherein the silicon compound has the formula MD₂D'₁M wherein R³, R⁴, R⁵, R⁸, R⁹ and R¹⁰ are each methyl, a is 1, c is 2, d is 1 and e is 1.

13. The process of claim 8 wherein the silicon compound has a formula MD_{13}D'₅M wherein R³, R⁴, R⁵, R⁸, R⁹ and R¹⁰ are each methyl, a is 1, c is 13, d is 5 and e is 1.

14. The process of claim 1 wherein the silicon compound is a silicon polymer.

15. The process of claim 1 wherein the unsaturated compound is 1-octene.

16. The process of claim 1 wherein said hydrosilylation is conducted in a fixed bed continuous process.

17. The process of claim 1 wherein the unsaturated compound is Eugenol.

18. The process of claim 1 wherein the precious metal catalyst comprises a noble metal selected from the group consisting of Pt, Pd, Rh, Ru, Ir and Os loaded on an organic polymeric support or an inorganic support selected from the group consisting of activated carbon, functionalized or non-functionalized silica, alumina, zeolite, nanoparticles etc.

19. The process of claim 18 wherein the precious metal catalyst comprises platinum supported on silica spheres having a particle diameter of about 1.0 mm, platinum supported on alumina powder, platinum supported on silica gel with particle size of 300-500 μm.

20. The process of claim 1 wherein said hydrosilylation is conducted in a batch process.

21. The process of claim 20 wherein the separation of the heterogeneous precious metal catalyst from the organosilicon product is performed by filtration or decantation after the hydrosilyltion reaction has been completed.

22. The process of claim 20 wherein the hydrosilylation reaction conditions include a temperature of from about 25 to 200° C., a pressure of up to about 500 psig, a batchtime of from about 5 minutes to one week, and a catalyst concentration in the batch content of from 1 to 5,000 ppm Pt.

23. The process of claim 1 wherein said hydrosilylation is conducted in a continuous fixed bed reactor.

24. The process of claim 23 wherein the organosil icon product out of fixed bed reactor is free of precious metal catalyst.

25. The process of claim 23 wherein the hydrosilylation reaction conditions include a reaction zone temperature of from at 25 to 200° C., a pressure of up to about 500 psig, a residence time of from about 1 minute to 24 hours.

26. The process of claim 1 wherein recovering of the precious metal is accomplished without distillation.

27. The process of claim 1 wherein the catalyst recovery is accomplished by incineration.

28. A personal care composition comprising the organosilicon product prepared in accordance with the process of claim 1.

29. A plastic additive composition comprising the organosilicon product prepared in accordance with the process of claim 1.

30. An agricultural composition comprising, the organosilicon product prepared in accordance with the process of claim 1.

31. A home care composition comprising the organosilicon product prepared in accordance with the process of claim 1.

32. A polyurethane foam comprising the organosilicon product prepared in accordance with the process of claim 1.

33. An organosiloxane product prepared in accordance with the process of claim 1.

34. An organosilane product prepared in accordance with the process of claim 1.

35. A process for manufacturing an organosilicon product having a stabilized low color and no formation of black particles during storage, the process comprising the steps of:
a) combining an unsaturated compound and a silicon compound having a reactive Si—H bond a reactant mixing vessel to provide a feed stream;
b) reacting the unsaturated compound and silicon compound under hydrosilylation conditions in a reaction zone in the presence of a heterogeneous precious metal catalyst to provide an organosilicon product having a color of less than 40 pt/co, wherein said hydrosilylation is conducted in a fixed bed batch process with recirculation of at least some of the product back to the reactant mixing vessel;
c) separating the heterogeneous precious metal catalyst from the organosilicon product; and
d) recovering the heterogeneous precious metal catalyst,
wherein the organosilicon product is a component in at least one of a personal care composition, an agricultural composition, a home care composition, a polyurethane foam composition, or a plastic additive composition.

36. A process for manufacturing an organosilicon product having a stabilized low color and no formation of black particles daring storage, the process comprising the steps of
a) reacting an unsaturated compound with, a silicon compound having a reactive Si—H bond under hydrosilylation conditions in a reaction zone in the presence of a heterogeneous precious metal catalyst to provide an organosilicon product having a color of less than 40 pt/co, wherein the hydrosilylation reaction is conducted in a continuous fixed bed reactor in a single pass mode wherein the reaction temperature is from 132 degrees C. to 150 degrees C., the space time yield is from 11.47 to 16.45 g product/(hour g catalyst) and the unsaturated compound is reacted in a mote excess of from 5 mol % to 15 mol %;
b) separating the heterogeneous precious metal catalyst from the organosilicon product; and
c) recovering the heterogeneous precious metal catalyst,
wherein the organosilicon product is a component in at least of a personal care composition, an agricultural composition, a home care composition, a polyurethane foam composition, or a plastic additive composition.

* * * * *